United States Patent Office 2,739,902
Patented Mar. 27, 1956

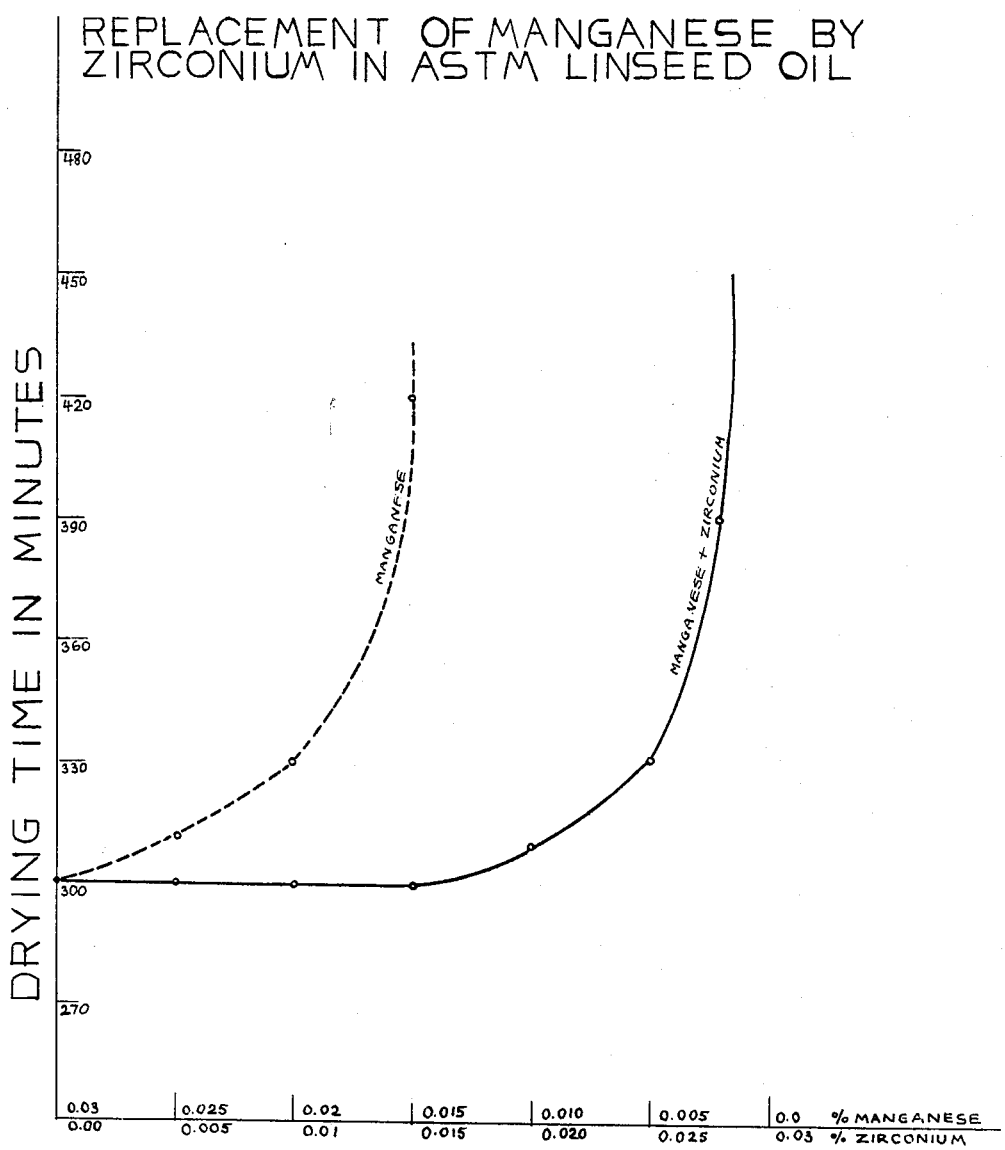

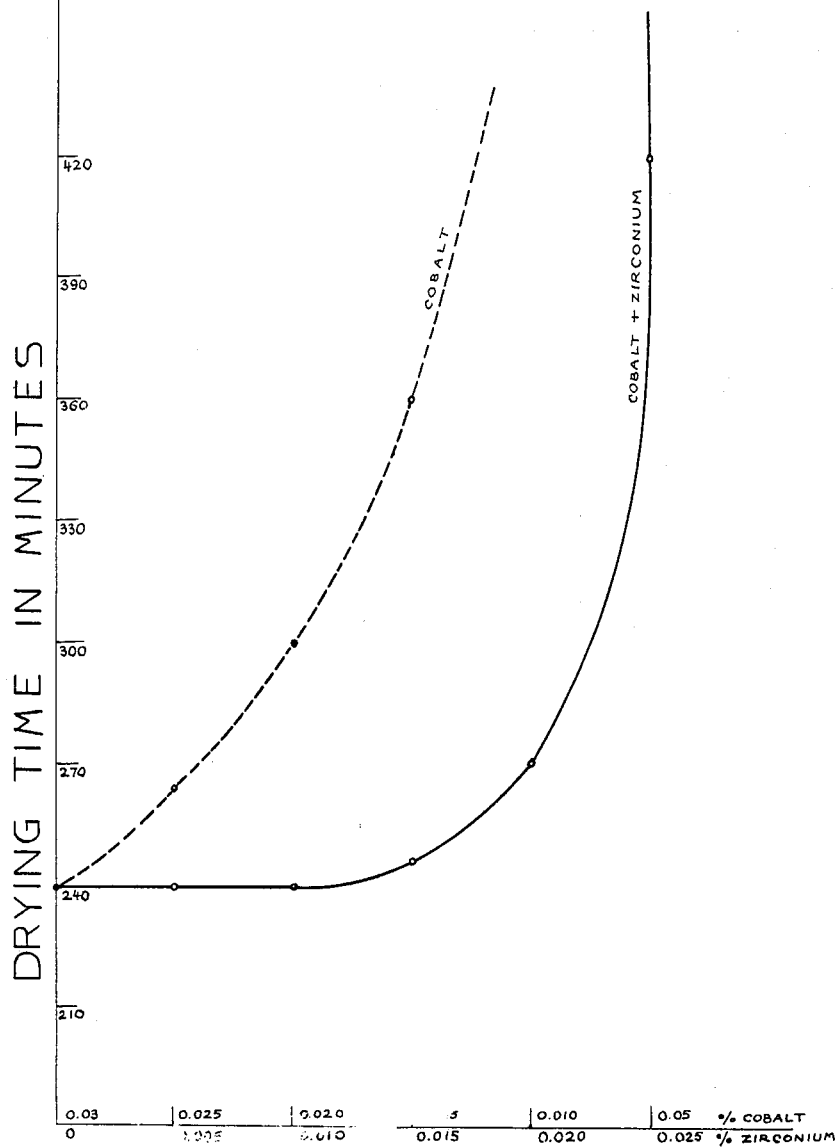

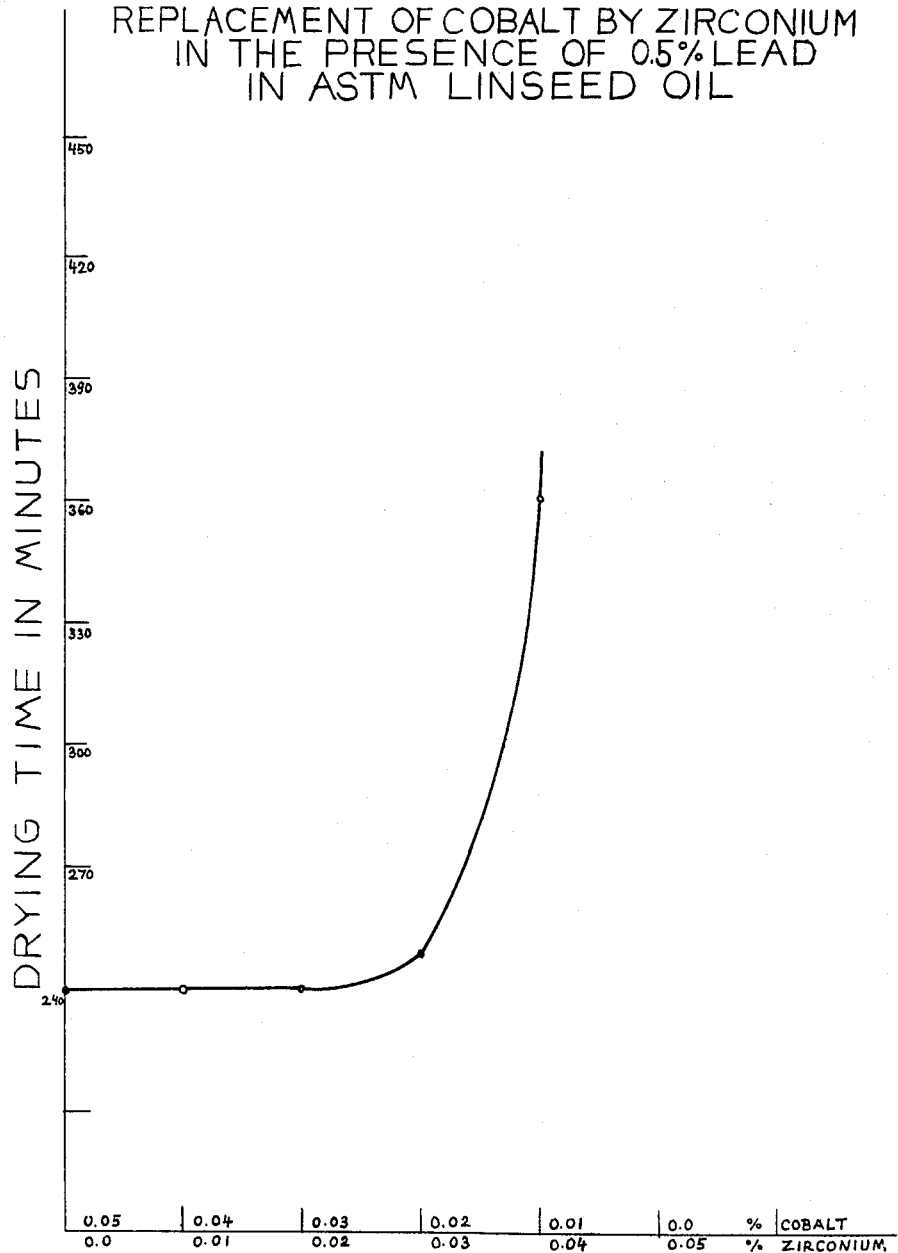

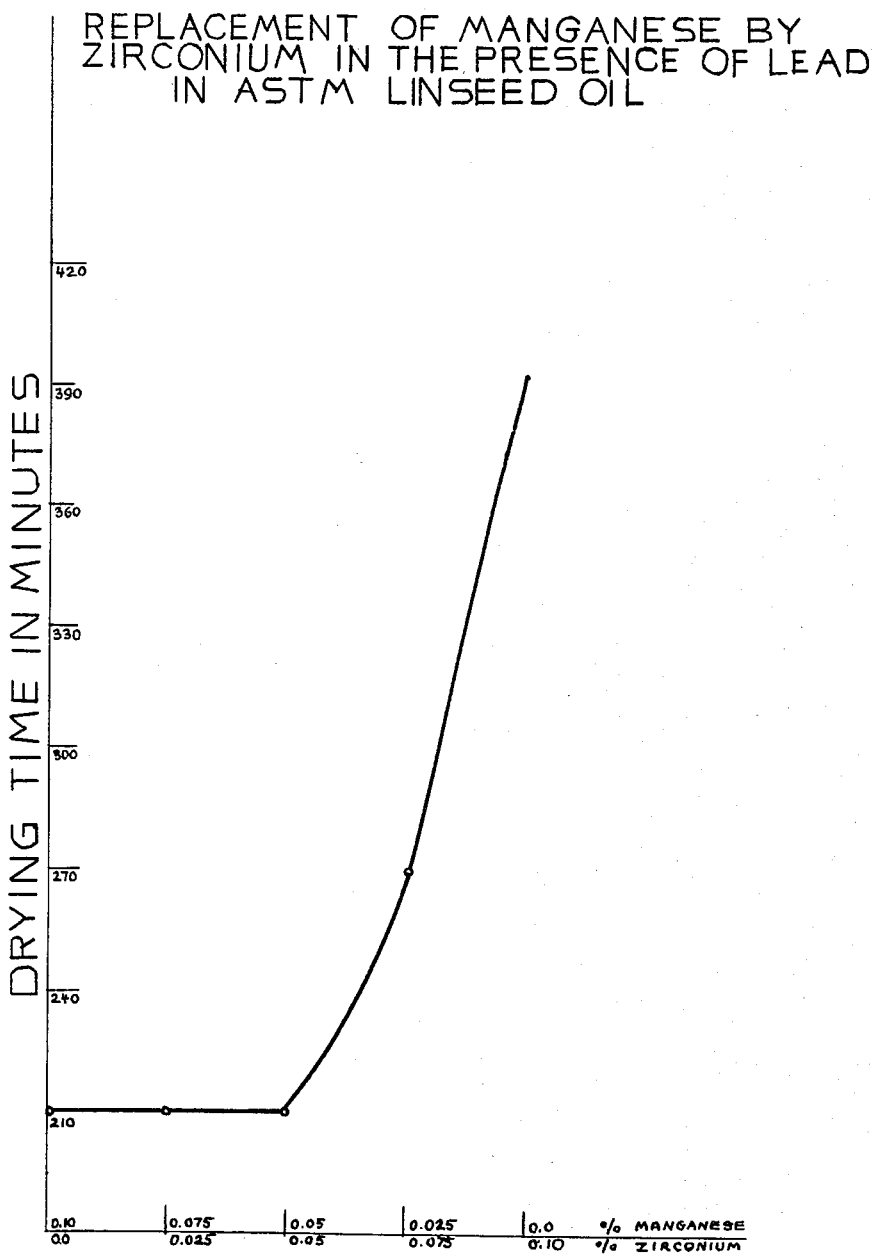

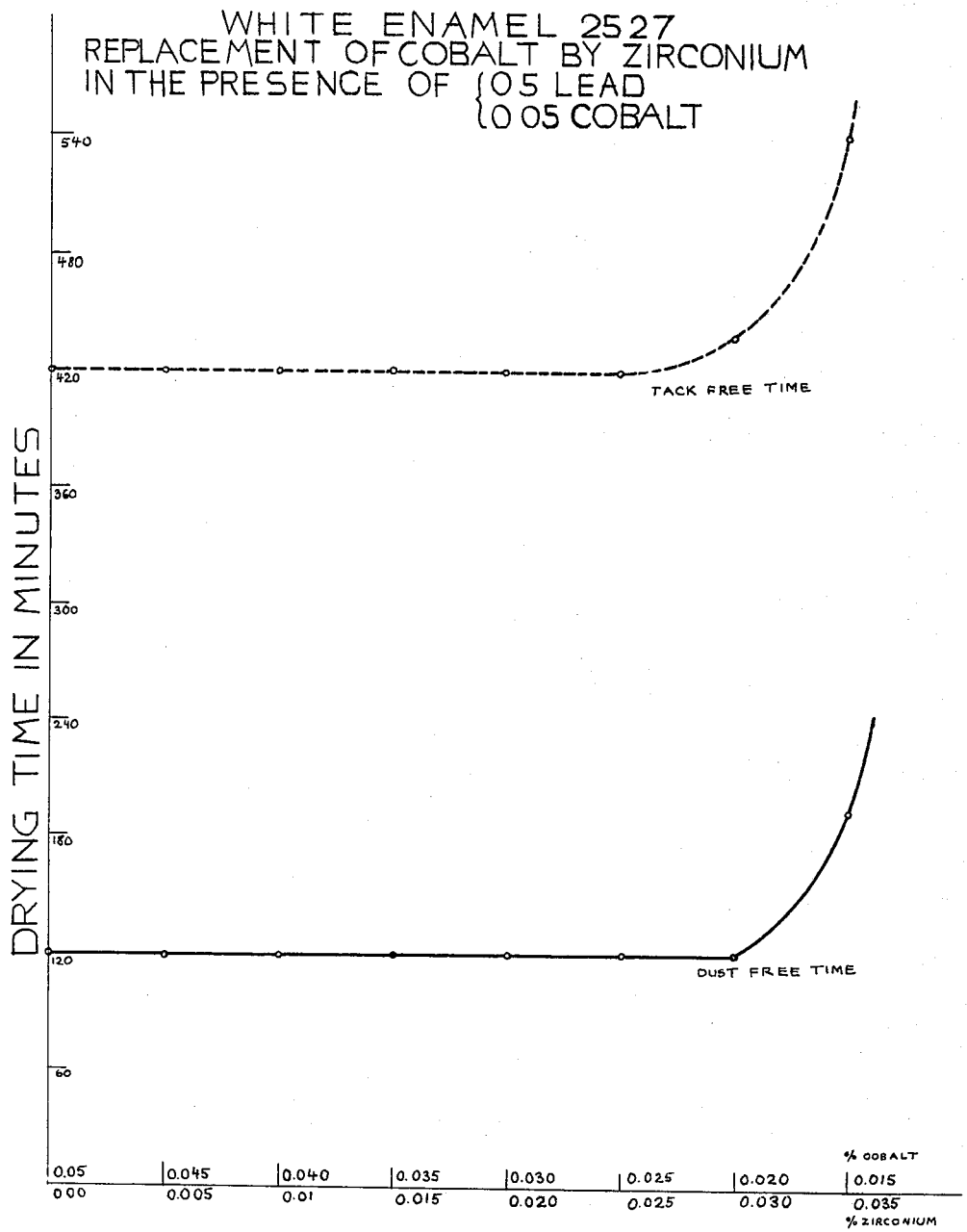

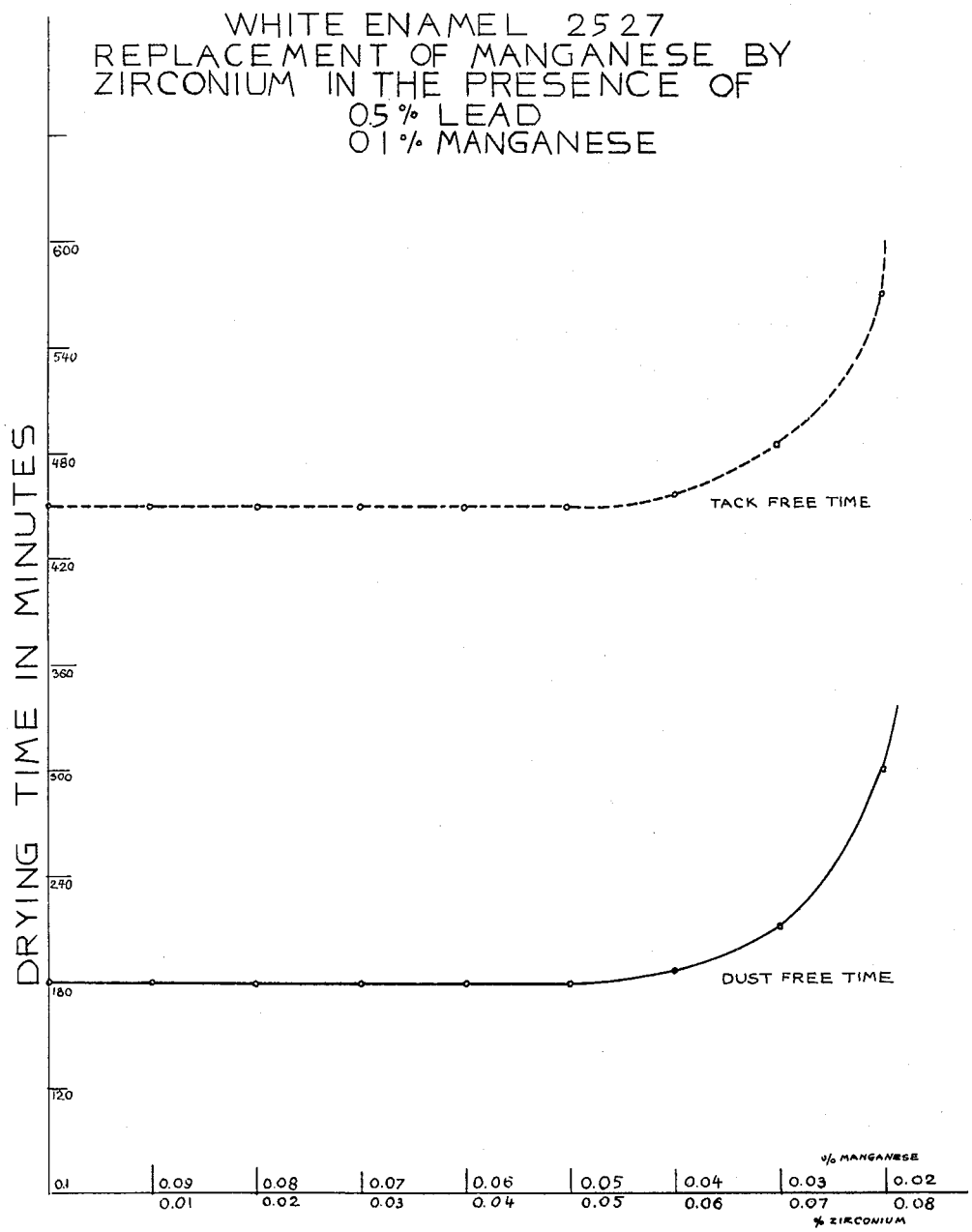

2,739,902
DRIER COMPOSITIONS

Gerry P. Mack, Jackson Heights, and Emery Parker, New York, N. Y., assignors, by mesne assignments, to Carlisle Chemical Works, Inc., Reading, Ohio, a corporation of Ohio Application August 29, 1952, Serial No. 307,152

10 Claims. (Cl. 106—264)

This invention relates to an improved drier system for drying oil containing compositions and to a method to improve the properties of drier compositions containing cobalt driers, manganese driers, and mixtures thereof.

The use of metallic soaps, or driers, in drying oil compositions has been known for centuries. They have the purpose to hasten the drying process and to promote the polymerization of the unsaturated drying oils to dry and mechanically resistant surface coatings.

The mechanism of the drying process involves a number of steps but the exact role of the drier has not been established to full satisfaction. A large number of metal salts, but also some purely organic compounds are being used and have been proposed as driers. From the practical point of view we distinguish between 1. Primary or surface driers,
2. Secondary or bottom driers,
3. Auxiliary driers.

Primary driers are those which accelerate the drying process and produce a dry tack-free surface in a short time. Such driers are the soaps of cobalt, manganese, and vanadium, of which cobalt is considered the most important. Manganese is equally good but the dark color of manganese soaps limits their use to a relatively low amount because an increased amount will cause considerable staining in the surface coating. Vanadium soaps are considered equally effective but their staining property is even higher than that of manganese.

Secondary or bottom driers are metal soaps which do not produce a fast tack-free dry surface but dry the film through. They are not used alone but always in combination with primary driers. Such secondary driers are, for instance, lead and calcium soaps. They cannot replace the primary driers and must be used in amounts additional to the amount of primary drier used in the formulation. But they are necessary to promote the simultaneous surface and bottom dry of the surface coating.

Auxiliary driers are compounds which although by themselves having no drying property whatsoever exert in combination with primary and secondary driers a beneficial influence on the drying process and the surface coating obtained. This influence is not manifested in an increase of the drying rate or in the through dry, but in their action as dispersants, thickeners, surface tension modifiers and the like in the coated film. Such metals are for example zinc, aluminum, lithium, and the alkaline earth metals.

The quantity of metals used to obtain a proper drying depends on a great variety of factors, such as the composition and nature of the drying oil and resin present, the nature and quantity of the pigment, the practical use to which the composition is put with respect to temperature, humidity and other conditions. Generally it is the practice to employ as small an amount of driers as possible and this not only from economical considerations but also because it is known that a large dosage of driers in a surface coating is highly detrimental for the ageing properties of the coating, causing embrittlement, discoloration, and peeling off of the surface coating film.

We have now discovered that under certain conditions compounds of zirconium are extremely useful in drying oil compositions though they do not fit in any of the above enumerated classes of driers. According to their performance we call them "Booster Driers."

Zirconium salts of the palmitic, stearic, naphthenic and other soap forming acids have been prepared by various methods, and it was inevitable that suggestions were made to use such zirconium soaps as driers. However, such attempts had no success, and these failures led the paint trade to the conclusion that zirconium soaps had no drying properties. (See the article by John Trevor on Zirconium and Cerium Naphthenates in American Paint Journal, January 2, 1939, pp. 42–43).

It is therefore a principal object of our invention to provide effective drier compositions in which as much as possible of the expensive and strategically critical metals, cobalt and manganese, is replaced by the abundant and cheap zirconium.

Another object of our invention is to provide a drier composition which ensures considerable savings in cobalt and manganese driers and, nevertheless, improves the properties of the dried oil compositions.

Still another object of our invention is to provide a method to determine in conventional drier compositions the amount of primary or surface driers which can be replaced by zirconium without impairing the drying properties of the composition.

Other objects and advantages will be apparent from a consideration of the specification and claims.

We have found that it is indeed impossible in drier compositions to simply substitute zirconium soaps for cobalt or manganese soaps. However, we discovered that it is possible to replace a considerable proportion of the primary driers by zirconium without impairing the drying properties of such compositions. More specifically, we have found that in the case of cobalt, depending on the vehicle used up to 60% of the cobalt usually employed in drier compositions can be replaced with zirconium, maintaining the same drying time; in the case of manganese up to 80% can be replaced. In addition, the surface films obtained with such drier compositions have a considerably improved "Sward" hardness and improved adhesion to various surfaces. They are more resistant toward water, and the staining caused by the drier is substantially reduced.

We further found that the secondary driers, such as particularly lead, can be completely replaced by zirconium, maintaining the same drying time but improving considerably the hardness and water resistance of the coatings. The amount of Zr for equal effect is about $\frac{1}{10}$ to $\frac{1}{2}$ of the Pb usually employed, dependent on the drying oil used and on the physical requirements of the coating. In the case of lead replacement an added advantage is that the coating obtained with zirconium as secondary drier will resist sulphur containing fumes without discoloration—a very distinct disadvantage of lead—and the toxicological objections raised against the use of lead, particularly in coatings which come in contact with foodstuffs, are completely eliminated, as it is established that zirconium is toxicologically completely harmless.

To sum up the features of zirconium, it can be said that zirconium by itself in the absence of other driers behaves like a poor secondary drier, but it boosts the activity of the primary driers in such a degree that up to 60 per cent of cobalt and up to 80 per cent of manganese can be replaced by zirconium maintaining the drying times of an identical system consisting only of cobalt and/or manganese, or Co+Pb, Co+Mn+Pb, whereby at the same time the hardness and water resistance of the coatings obtained is considerably improved.

Suitable zirconium compounds are particularly zirconyl naphthenate, 2-ethyl hexoate, tallate, linoleate, and generally the salts of zirconyl oxide ZrO with aliphatic straight or branched saturated or unsaturated monocarboxylic acids. Also zirconyl compounds of aliphatic acids may be used in which the hydrocarbon chain is interrupted by O or S atoms, i. e. ether or thioether monocarboxylic acids.

The higher tetra monocarboxylic acid salts of zirconium of the formula $Zr(OOCR)_4$ can be used too.

The zirconyl compounds containing the group ZrO are best obtained by the double decomposition of water soluble zirconium salts, for instance zirconium oxychloride or zirconium sodium sulfate, with the alkali salt of the respective acid or by the fusion of a water insoluble zirconium carbonate with the acid itself.

As a typical example, the preparation of the zirconyl 2-ethyl hexoate may be described.

154 g. of sodium zirconyl sulfate (0.4 mol) of the formula $$O=Zr(SO_4Na)_2 \cdot 2H_2O$$

are dissolved in 500 cc. of cold water. To the clear solution is added a neutral solution of 116 g. (0.8 mol) of 2-ethylhexoic acid dissolved in 32 g. of caustic soda in 200 cc. of water. The precipitate which is formed is separated, washed with cold water and dissolved in petrolether. The solution is separated from last traces of water by drying with anhydrous sodium sulfate, filtered, and the petrolether is then removed by heating under reduced pressure.

The product obtained contains 22.6% of zirconium. When it is digested with cold methyl alcohol and dried, a zirconium compound is obtained having 26.45% of zirconium and the methanol extract contains 2-ethylhexoic acid. From the zirconium analysis and the 2-ethylhexoic acid content of the purified compound the conclusion is drawn that the product obtained is a mixed salt consisting of the 2 compounds according to Formulas 1 and 2.

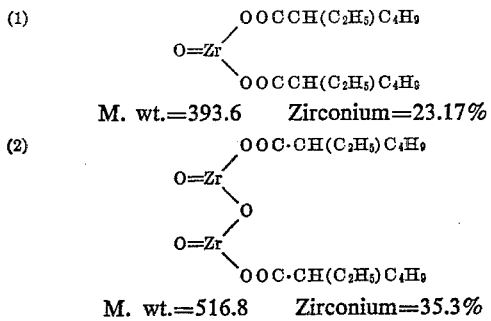

(1)

M. wt.=393.6   Zirconium=23.17%

(2)

M. wt.=516.8   Zirconium=35.3%

The compound does not contain any zirconium oxide or hydrated zirconium oxide, because it is completely soluble in petrolether, whereas a mixture containing zirconium oxide and zirconium ethylhexoate is only partly soluble in that solvent.

Although we were not able to separate the two compounds from each other, we found that it is possible to increase the amount of compound according to Formula 2, i. e. the zirconium content, in the mixture substantially, without decreasing the solubility of the compound in aliphatic and aromatic hydrocarbons. Using a dry or steam distillation technique it was possible to obtain compounds having 30.5% of zirconium corresponding to a mixture of about 60% of the dimer and 40% of the monomer, which compound is still completely soluble in hydrocarbons. If the zirconium content rises above 35.5%, the compound is no longer completely soluble in organic solvents, and is of no value for the intended application as booster drier.

The presence of the free acid is, however, not harmful beyond decreasing the useful zirconium content.

Other fatty acid salts behave in an identical manner and zirconium salts of hexoic acid, 2-ethylbutyric acid, caprylic, nonylic, decanoic, lauric, myristic, palmitic, stearic, oleic, linoleic, ricinoleic, linolenic, abietic, naphthenic, and other acids can be used. Also mixtures of these acids with each other or the mixture as obtained after saponification of various oils can be employed. Synthetic monocarboxylic acids, alkoxy fatty acids, also aromatic acids such as phenylacetic acid, paratertiarybutyl phenylacetic acid, phenoxy and substituted phenoxy fatty acids are suitable.

The invention will now be described more in detail with reference to the accompanying drawings, where Fig. 1 is a graph showing the drying times of ASTM linseed oil with pure manganese drier and with manganese-zirconium combinations;

Fig. 2 is a similar graph for cobalt and cobalt-zirconium combinations;

Figs. 3 and 4 are similar graphs showing the influence of zirconium additions in the presence of lead, and Figs. 5 and 6 show the tack-free and dust-free times in the gradual replacement of a cobalt and manganese drier by a zirconium drier.

The curves and examples represent the results of tests made with the 2-ethylhexoates; the curves obtained with other driers such as linoleates or naphthenates show the same general pattern. The percentage figures refer to the metals.

The performance of cobalt-zirconium and manganese-zirconium combinations is demonstrated in Figures 1 and 2. The curves represent the drying isotherms, whereby the drying times are plotted against the metal concentration used in the ASTM linseed oil. The drying times were determined as described in ASTM test for drying oils D555–47 (1949). The full line curves represent the drying isotherms of the Co+Zr and Mn+Zr combination, whereby the total metal content is kept constant but the ratio of the two metals is changed. The dotted lines represent the drying isotherms of the Mn and Co alone, where the metal content is decreased in the same ratio as in their zirconium combination with Zr. It will be noted that in the case of manganese replacement in linseed oil up to a ratio of about 60% of Zr+40% of Mn, the drying times remain practically identical and at 80% Zr+20% Mn the increase in drying time is just slightly above the experimental error range. In the case of cobalt replacement, the drying times remain constant up to about 50% of Co+50% Zr and are slightly higher at 60% Zr+40% Co, but rapidly increase above this ratio.

In the presence of a secondary drier and using also ASTM linseed oil Figures 3 and 4 demonstrate the performance of the drier combinations. The initial drier combination used was 0.5% Pb and 0.05% Co then maintaining in all cases the 0.5% lead and decreasing gradually the Co and Mn content the same time the Zr concentration was gradually increased to maintain the total metal concentration in all experiments. The shape of the curves is essentially the same as in Figures 1 and 2 and the small differences may be attributed to the somewhat different metal concentration used.

The limiting value of the primary drier metal replacement has a maximum, whereby however the equal drying times are considered to be the only criterion to establish this limiting value. The replacement can be expressed by the following equations. If we consider that $$xCo+yMn=DR=$$

the drier requirement of the system and where $x$ equals the per cent cobalt metal used in the system and expressed as 100 and $y$ equals the per cent manganese metal used in the system also expressed as 100, then the replacement can be expressed as follows:

$$(x-t_1)Co+yMn+t_1Zr=DR$$
$$xCo+(y-t_2)Mn+t_2Zr+DR$$

In these equations $t_1$ and $t_2$ represent the magnitude of the zirconium metal replacement and if $x$ and $y$ are figures as 100, $t_1$ is a number from 0 to max. 60, and $t_2$ a number from 0 to 80. $t_1$ and $t_2$, however, cannot be higher than $$\frac{t_1^{max}+t_2^{max}}{2}$$

This refers for the case when part of both metals are replaced. This means also that we cannot replace up to 60% cobalt plus 80% manganese but only either one of the metals or part of both metals in which latter case the sum of $t_1+t_2$ should not be higher than the half of the sum of their maximum values.

In its broadest form, this replacement law may be expressed by the formula $$(a-x)Co+(b-y)Mn+(x+y)Zr=100$$

wherein $a+b=100$; $x+y=5$ to 80; $x$ is not higher than $\frac{3}{5} a$, and $y$ is not higher than $\frac{4}{5} b$.

We further found that lead can be replaced entirely by zirconium but the amount of zirconium to be used can be much lower than the amount of lead usually employed. It has been established that about one-tenth of zirconium will replace the amount of lead employed in a formulation. In other words, if a formulation calls for 0.5% of lead, then 0.05% of zirconium can be used with equal success. Larger amounts of zirconium do not influence the drying time, but the dust-free time is prolonged. Of course this does not mean that if in a formulation the entire amount of lead is replaced the primary driers usually present in such a formulation can also be replaced using above formulas. Summarizing, the total amount of Zr in a paint formulation should not exceed the amounts as expressed in above formula by $$\frac{t_1^{max}+t_2^{max}}{2}$$

regardless of what is replaced, the two primary or the secondary drier. The examples which follow will illustrate more fully the effect obtained in drier combinations using zirconium in form of various organic compounds.

Example 1

White enamel consisting of an oil modified alkyd resin (containing 45% of oil and 35% of phthalic anhydride) and 30% of titanium dioxide pigment was used for the following series of experiments. The oil films were applied in 3 mil thickness by the use of a Bird applicator on glass panels, which were placed in a drying cabinet where the temperature was maintained at 25° C., the relative humidity at 65%, and air was slowly circulated through the cabinet.

| Lead in percent | 0.5 | 0.5 | 0.5 | 0.5 | 0.5 | 0.5 |
|---|---|---|---|---|---|---|
| Cobalt in percent | 0.5 | 0.04 | 0.03 | 0.02 | 0.01 | |
| Zirconium, percent | | 0.01 | 0.02 | 0.03 | 0.04 | 0.05 |
| Dust-free time, in min | 120 | 120 | 120 | 120 | 260 | 7,360 |
| Tack-free time, in min | 420 | 420 | 420 | 420 | 7,600 | 71,000 |

| Lead in percent | 0.5 | 0.5 | 0.5 | 0.5 | 0.5 | 0.5 |
|---|---|---|---|---|---|---|
| Cobalt in percent | 0.03 | 0.03 | 0.02 | 0.015 | 0.01 | 0.01 |
| Manganese, percent | 0.02 | 0.01 | 0.01 | 0.01 | 0.01 | |
| Zirconium, percent | | 0.01 | 0.02 | 0.025 | 0.03 | 0.04 |
| Dust-free time, in min | 120 | 120 | 120 | 120 | 120 | 190 |
| Tack-free time, in min | 420 | 420 | 420 | 420 | 420 | 420 |

| Cobalt in percent | 0.05 | 0.03 | 0.03 |
|---|---|---|---|
| Manganese, percent | 0.02 | 0.02 | 0.01 |
| Zirconium, percent | | 0.02 | 0.03 |
| Dust-free time, in min | 150 | 150 | 150 |
| Tack-free time, in min | 420 | 420 | 420 |

The hardness of the films increased with increased zirconium content and the gloss of the films also improved. The staining caused particularly by manganese was substantially reduced.

Example 2

39.4 parts of an alkyd modified non-phthalic medium oil length oleoresinous varnish sold under the tradename Aroplaz 1314 M was mixed with 32 parts of titanium dioxide pigment, marketed under the trade name Titanox AA, 3.6 parts of dipentene and 25 parts of mineral spirits and cast on glass panels in the same manner as in Example 1. The Sward hardnesses of the films after 110 hours of air drying were compared using the following drier formulations:

| Lead, percent | 0.75 | 0.75 | 0.75 |
|---|---|---|---|
| Cobalt, percent | 0.06 | 0.05 | 0.03 |
| Zirconium, percent | | 0.01 | 0.03 |
| Sward hardness | 12 | 14 | 16 |

| Lead, percent | | 0.50 | 0.50 |
|---|---|---|---|
| Cobalt, percent | | 0.05 | 0.025 |
| Zirconium, percent | | | 0.025 |
| Sward hardness | | 10 | 16 |

| Lead, percent | 0.75 | 0.75 | 0.75 |
|---|---|---|---|
| Manganese, percent | 0.06 | 0.03 | 0.01 |
| Zirconium, percent | | 0.03 | 0.05 |
| Sward hardness | 12 | 14 | 16 |

| Lead, percent | | 0.50 | 0.50 |
|---|---|---|---|
| Cobalt, percent | | 0.03 | 0.015 |
| Manganese, percent | | 0.02 | 0.015 |
| Zirconium, percent | | | 0.02 |
| Sward hardness | | 15 | 18 |

The tables show clearly that lead containing drier compositions in which part of the cobalt and/or manganese was replaced by zirconium produced a better Sward hardness than compositions containing only cobalt and/or manganese.

Example 3

A slow drying white enamel having 20% drying oil constituents consisting of bodies linseed oil and pentaerythritol modified oleoresinous alkyd resin and containing about 25% "Tical" pigment (which consists of about 30% titanium dioxide and 70% calcium carbonate) the rest being mineral spirit, was used for the following series of drying tests. The appropriate amount of driers were added to the enamel and the so compounded mixture was cast with a Bird applicator on glass panels as described in Example 1. The results of the drying test are indicated in the following table:

| Enamel, g | 99 | 99 | 99 | 99 | 99 | 99 | 99 | 99 |
|---|---|---|---|---|---|---|---|---|
| Lead, percent | 0.4 | 0.4 | 0.4 | | | | | |
| Cobalt, percent | 0.045 | 0.045 | 0.03 | 0.025 | 0.045 | 0.045 | 0.045 | 0.045 |
| Calcium, percent | 0.01 | | | | | | | |
| Zirconium, percent | | 0.01 | 0.015 | 0.02 | 0.1 | 0.15 | 0.2 | 0.4 |
| D. F. drying time (hours) | 7 | 7 | 7 | 7 | 7 | 7 | 7 | 7 |
| T. F. drying time (hours) | 10 | 10 | 10 | 10 | 10 | 9½ | 9½ | 9½ |
| Sward hardness after 144 hours | 14 | 20 | 20 | 20 | 18 | 20 | 22 | 22 |

All formulations containing zirconium exhibit a substantially higher hardness and a superior adhesion. Also when Zr containing films are exposed to an atmosphere containing hydrogen sulfide, no discoloration takes place, whereas the enamel containing lead turns brown after a few hours exposure.

The zirconium 2-ethylhexoate used in the examples has been disclosed and claimed in our co-pending application of the same date, Serial No. 307,153.

We may use the drier composition in film-forming bases conventionally employed in paints, varnishes, enamels, printing inks and linoleum print paints containing a drying or semi-drying oil fatty acid radical. The film-forming base contains about 0.01 to 1 per cent, preferably 0.025 to 0.1 per cent, by weight of our new drier composition, based upon the weight of the metals (Zr, Co and/or Mn) and upon the polymerizable drying oil or semi-drying oil content of the base.

The composition of such film-forming bases is well known in the art. The bases may include the usual pigments, extenders and fillers, and are prepared from drying or semi-drying oils, such as linseed oil, dehydrated castor oil, and the like, from esters of drying or semi-drying oil fatty acids with polyhydric alcohols, from drying or semi-drying oil modified resins, particularly modified alkyd or phenolic resins, from modified rosin esters and natural resins.

What we claim is:

1. A drier composition containing (1) a surface drier selected from the group consisting of cobalt soaps, manganese soaps, and mixtures of cobalt and manganese soaps, and (2) as a booster for said surface drier a zirconium salt of an acid selected from the group consisting of higher fatty acids, alkoxy and phenoxy fatty acids, ether and thioether monocarboxylic acids, talloil fatty acid, and naphthenic acid, in proportions calculated on metal content by weight corresponding to the formula:

$$(a-x)Co + (b-y)Mn + (x+y)Zr = 100$$

wherein $a+b=100$; $x+y=5$ to 80, $x$ is not higher than $\tfrac{3}{5} a$, and $y$ is not higher than $\tfrac{4}{5} b$.

2. A drier composition containing as active drying constituents a cobalt drier and as a booster for said cobalt drier a zirconium salt of an acid selected from the group consisting of higher fatty acids, alkoxy and phenoxy fatty acids, ether and thioether monocarboxylic acids, talloil fatty acid, and naphthenic acid, said cobalt drier and zirconium salt being present in the ratio of about 5 to 60 per cent of cobalt to about 95 to 40 per cent of zirconium, calculated on the metal content by weight.

3. A drier composition containing as active drying constituents a manganese drier and as a booster for said manganese drier a zirconium salt of an acid selected from the group consisting of higher fatty acids, alkoxy and phenoxy fatty acids, ether and thioether monocarboxylic acids, talloil fatty acid, and naphthenic acid, said manganese drier and zirconium salt being present in the ratio of about 5 to 80 per cent of manganese to about 95 to 20 per cent of zirconium, calculated on the metal content by weight.

4. A drier composition containing as active drying constituents a manganese drier, a cobalt drier, and as a booster for said manganese and cobalt drier a zirconium salt of an acid selected from the group consisting of higher fatty acids, alkoxy and phenoxy fatty acids, ether and thioether monocarboxylic acids, talloil fatty acid, and naphthenic acid, said manganese and cobalt drier and zirconium salt being present in the ratio of about 5 to 75 per cent of zirconium to about 95 to 25 per cent of combined manganese and cobalt, calculated on the metal content by weight.

5. A drying oil composition containing a substituent selected from the group consisting of the drying and semi-drying oil fatty acid radicals and as a drier a mixture containing a cobalt drier, and as a booster for said cobalt drier a zirconium salt of an acid selected from the group consisting of higher fatty acids, alkoxy and phenoxy fatty acids, ether and thioether monocarboxylic acids, talloil fatty acid, and naphthenic acid, said mixture being present in an amount of about 0.01 to about 1 per cent by weight based upon the content of polymerizable oil, the ratio of cobalt to zirconium in said drier mixture being about 5 to 60 per cent of cobalt to about 95 to 40 per cent of zirconium, calculated on the metal content by weight.

6. A drying oil composition containing a substituent selected from the group consisting of the drying and semi-drying oil fatty acid radicals and as a drier a mixture containing a manganese drier and, as a booster for said manganese drier a zirconium salt of an acid selected from the group consisting of higher fatty acids, alkoxy and phenoxy fatty acids, ether and thioether monocarboxylic acids, talloil fatty acid, and naphthenic acid, said mixture being present in an amount of about 0.01 to about 1 per cent by weight based upon the content of polymerizable oil, the ratio of manganese to zirconium in said drier mixture being about 5 to 80 per cent of manganese to about 95 to 20 per cent of zirconium, calculated on the metal content by weight.

7. A drying oil composition containing a substituent selected from the group consisting of the drying and semi-drying oil fatty acid radicals and as a drier a mixture containing a cobalt drier and a manganese drier, and a zirconium salt of an acid selected from the group consisting of higher fatty acids, alkoxy and phenoxy fatty acids, ether and thioether monocarboxylic acids, talloil fatty acid, and naphthenic acid, said mixture being present, in an amount of about 0.01 to about 1 per cent by weight based upon the content of polymerizable oil, the ratio of zirconium to cobalt and manganese being about 5 to 75 per cent of zirconium to about 95 to 25 per cent of combined manganese and cobalt, calculated on the metal content by weight.

8. A method of boosting the drying efficiency of cobalt driers, manganese driers, and mixtures thereof, contained as primary driers in drier compositions, said method comprising adding to said compositions at least about 20 per cent, calculated on the metal content by weight, of a zirconium salt of an acid selected from the group consisting of higher fatty acids, alkoxy and phenoxy fatty acids, ether and thioether monocarboxylic acids, talloil fatty acid and naphthenic acid.

9. A method of boosting the drying efficiency of cobalt driers, manganese driers, and mixtures thereof, contained as primary driers in drier compositions, said method comprising adding to said compositions at least about 5 per cent, calculated on the metal content by weight, of a zirconium salt of an acid selected from the group consisting of higher fatty acids, alkoxy and phenoxy fatty acids, ether and thioether monocarboxylic acids, talloil fatty acid, and naphthenic acid.

10. A method of boosting the drying efficiency of cobalt driers, manganese driers and mixtures thereof, contained as primary driers in drier compositions producing a predetermined drying effect, said method comprising replacing from 5 to 80 per cent by weight of the manganese drier and from 5 to 60 per cent by weight of the cobalt drier producing said predetermined drying effect by the corresponding amount of a zirconium salt of an acid selected from the group consisting of higher fatty acids, alkoxy and phenoxy fatty acids, ether and thioether monocarboxylic acids, talloil fatty acid, and naphthenic acid.

References Cited in the file of this patent

UNITED STATES PATENTS

| 1,895,200 | Meidert | Jan. 24, 1933 |
| 2,132,997 | Plechner | Oct. 11, 1938 |
| 2,221,975 | Kinzie et al. | Nov. 19, 1940 |
| 2,573,049 | Olson | Oct. 30, 1951 |
| 2,584,041 | Nowak et al. | Jan. 29, 1952 |

OTHER REFERENCES

Official Digest, June 1953, pages 350–358 (Paint & Varnish Production Clubs).